L. TALCOTT.
Wagon-Rack.
No. 210,820. Patented Dec. 10, 1878.
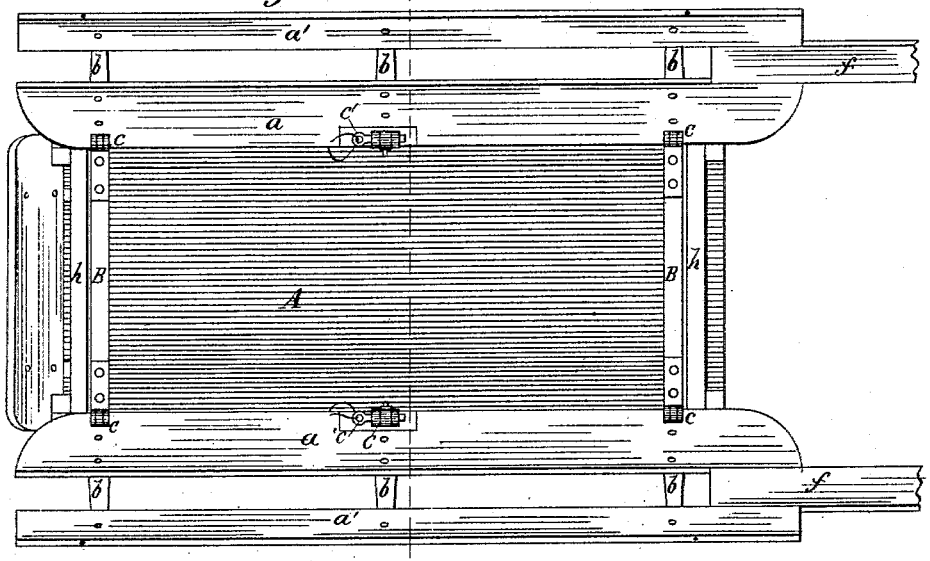
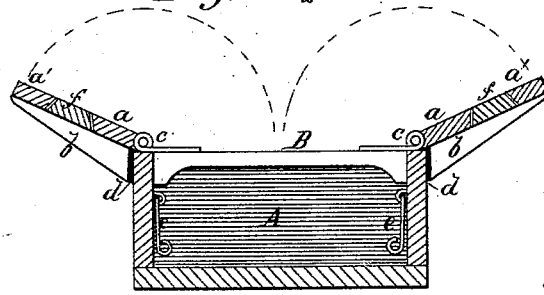
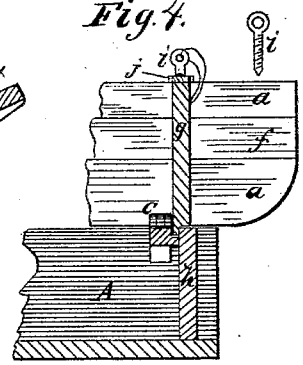
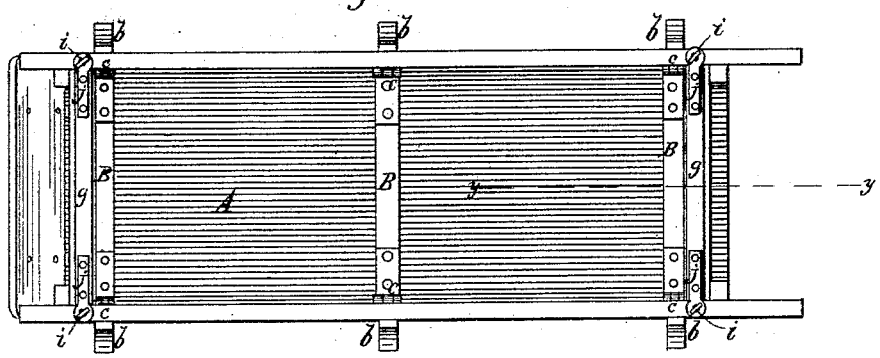
WITNESSES:
Henry N. Miller
C. Sedgwick
INVENTOR:
L. Talcott
BY Munn & Co
ATTORNEYS.

UNITED STATES PATENT OFFICE.

LEVI TALCOTT, OF MINETTO, NEW YORK.

IMPROVEMENT IN WAGON-RACKS.

Specification forming part of Letters Patent No. 210,820, dated December 10, 1878; application filed November 18, 1878.

*To all whom it may concern:*

Be it known that I, LEVI TALCOTT, of Minetto, in the county of Oswego and State of New York, have invented a new and Improved Wagon-Rack, of which the following is a specification:

The object of this invention is to furnish a light and substantial rack for wagon-bodies, to be used either in transporting grain or hay, and for other purposes.

The invention will first be described in connection with the drawing, and then pointed out in the claims.

In the accompanying drawings, Figure 1 is a top view or plan of my improvement. Fig. 2 is a cross-section on line $x\ x$. Fig. 3 is a top view or plan of the body and rack folded up above it to increase its capacity, and Fig. 4 is a longitudinal section of the same on line $y\ y$.

Similar letters of reference indicate corresponding parts.

Referring to the drawings, A represents the wagon-body.

The rack is composed of the boards $a'\ a$, fastened to cleats $b\ b\ b$, and these cleats, at the inner end, are connected with the cross-bars B B B by strap-hinges $c$, the ends whereof, as well as the ends of the cleats, (which have rubber facing $d$,) abut against the sides of the wagon-body, as shown in Fig. 2, and clamp the rack to the body.

At the middle of the wagon-body are placed hasps $e$, connected at their fixed ends with the body on the inside by staples, and having rings or eyes on their free ends, and connected with the strap-hinges $c$ on cleats $b$ by passing the pintles $c'$ of the latter through the eyes on the free ends of the hasps. In this way the rack can be connected firmly and securely with the body, as in Fig. 1, by the connection of the same with the hasp $e$, so that it cannot be lifted from its place without withdrawing pintle $c'$, whereas when cross-bars B alone are used it can be readily lifted off. This manner of fastening it is useful when the wings are turned up to make a larger body, as will presently be described.

In this way it will be seen that the rack is firmly clasped to the wagon-body, and cannot be jarred out of its place. At the same time it can be easily and quickly removed by simply slipping out the pintle forming the hinge at the middle bar, B', and turning the wings over on the body in the way indicated by the curved dotted lines in Fig. 2.

The ends of cleats $b$ are cut at such an angle to the wings that when they are placed in contact with the sides of the body they will maintain the wings in the proper position with relation thereto, as shown in the drawing.

The rubber facing on the ends of the cleats, and interposed between them and the body sides, prevents rubbing, scratching, &c.

When the body is to be used to contain articles not suitable to be placed on the rack, and it is desired to increase the capacity of the body, the removable boards $f$ are inserted between boards $a\ a'$, the connection of the edges being made by a dovetailed joint between the same, to prevent the boards from falling out. The wings are then turned up perpendicularly, and movable end boards $g\ g$ are placed between the wings immediately over the body and boards $h\ h$, (there being rabeted connections made between them, as shown in Fig. 4,) and they are secured in place by pins $i$, passed through eyes in the straps $j$ on the upper edge of the boards, and thence into sockets in the boards $a'$ of the wings. This secures the wings and end boards together securely, and thus the capacity of the body is largely increased, and it is adapted to carry any of the loose articles usually carried in the main body A—as, for instance, wheat, corn, potatoes, &c.

The rack is adapted not only to wagon-bodies, but may be used without them by simply putting on the running-gear two loose boards and placing the rack thereon, which holds the boards stationary and secures the two together.

Having thus described my invention, I claim as new and desire to secure by Letters Patent—

1. As an improvement in wagon-racks, the cleats $b$, to which the planks forming the wings are attached, having rubber face $d$, in combination with cross-bars B and hinges c, to clasp the sides of the wagon-body and hold the rack on the same, substantially as described.

2. As an improvement in wagon-racks, the hinged wings, held to the body by the cross-bars B, and the hasps e, in combination with movable boards f and movable end boards g, secured in place by pins i to form a close body above the main body A and in addition thereto, substantially as described.

LEVI TALCOTT.

Witnesses:
 J. W. BOHANNAN,
 N. D. GROESBECK.